United States Patent
Williams et al.

(10) Patent No.: US 11,624,278 B2
(45) Date of Patent: Apr. 11, 2023

(54) WELLFIELD MANAGEMENT SYSTEMS AND METHODS

(71) Applicant: GEOSCIENCE Support Services, Inc., La Verne, CA (US)

(72) Inventors: Dennis E. Williams, Altadena, CA (US); Mark D. Williams, Long Beach, CA (US)

(73) Assignee: GEOSCIENCE Support Services, Inc., LaVerne, CA (US)

(*) Notice: Subject to any disclaimer, the term of this patent is extended or adjusted under 35 U.S.C. 154(b) by 217 days.

(21) Appl. No.: 16/870,767

(22) Filed: May 8, 2020

(65) Prior Publication Data

US 2020/0355067 A1 Nov. 12, 2020

Related U.S. Application Data

(60) Provisional application No. 62/845,206, filed on May 8, 2019.

(51) Int. Cl.
| | |
|---|---|
| *E21B 47/13* | (2012.01) |
| *G05B 15/02* | (2006.01) |
| *H04L 67/125* | (2022.01) |
| *E21B 43/01* | (2006.01) |
| *G01N 11/00* | (2006.01) |
| *E21B 43/30* | (2006.01) |

(52) U.S. Cl.
CPC .............. *E21B 47/13* (2020.05); *E21B 43/01* (2013.01); *E21B 43/30* (2013.01); *G01N 11/00* (2013.01); *G05B 15/02* (2013.01); *H04L 67/125* (2013.01); *G05B 2219/24215* (2013.01)

(58) Field of Classification Search
CPC .......... E21B 47/13; E21B 43/01; E21B 43/30; E21B 43/00; G01N 11/00; G05B 15/02; G05B 2219/24215; H04L 67/125; H04L 67/12

See application file for complete search history.

(56) References Cited

U.S. PATENT DOCUMENTS

| | | | | |
|---|---|---|---|---|
| 5,422,550 | A * | 6/1995 | McClanahan | H02P 5/50 60/420 |
| 5,553,492 | A * | 9/1996 | Barrett | E21B 47/00 73/152.29 |
| 6,542,827 | B1* | 4/2003 | Koster | G05B 15/02 702/50 |
| 2001/0042722 | A1* | 11/2001 | Bryant | A62D 3/33 210/720 |

(Continued)

OTHER PUBLICATIONS

Brill et al., "Planning versus competitive rates of groundwater pumping", Jun. 1994, Water Resources Research, vol. 30, No. 6, pp. 1873-1880.*

*Primary Examiner* — Mohammad Ali
*Assistant Examiner* — Sheela Rao
(74) *Attorney, Agent, or Firm* — Sheppard, Mullin, Richter & Hampton LLP

(57) ABSTRACT

Systems and methods corresponding with improved wellfield management are provided. In some examples, the system may initiate a step drawdown test of well efficiency to determine a cause of a decreased discharge rate of the wellfield site. The system may alter pumping of the wellfield site based on the step drawdown test, wherein a command signal is transmitted via a SCADA system to the wellfield site.

23 Claims, 14 Drawing Sheets

(56) References Cited

U.S. PATENT DOCUMENTS

| | | | |
|---|---|---|---|
| 2004/0076524 A1* | 4/2004 | Hanson | F04D 13/16 |
| | | | 417/423.3 |
| 2005/0273183 A1 | 12/2005 | Curt et al. | |
| 2007/0239640 A1 | 10/2007 | Coppola, Jr. et al. | |
| 2007/0265778 A1 | 11/2007 | Suter et al. | |
| 2008/0120036 A1* | 5/2008 | Kimminau | E21B 47/103 |
| | | | 702/12 |
| 2008/0190604 A1* | 8/2008 | Hild | E21B 47/008 |
| | | | 166/250.15 |
| 2009/0278519 A1* | 11/2009 | Lindemann | H04L 25/02 |
| | | | 323/282 |
| 2010/0193183 A1 | 8/2010 | Lambie et al. | |
| 2012/0141301 A1 | 6/2012 | Van Der Spek et al. | |
| 2013/0019672 A1* | 1/2013 | Hemsing | E21B 47/06 |
| | | | 73/152.51 |
| 2016/0265341 A1 | 9/2016 | Subervie et al. | |
| 2016/0314409 A1* | 10/2016 | Bittencourt | G05B 13/0265 |
| 2017/0051737 A1* | 2/2017 | Ellsworth | F04B 49/065 |
| 2020/0308962 A1* | 10/2020 | Allouche | E21B 49/00 |

\* cited by examiner

| Site Identifier | Time | Discharge Rate | Water Level | System Pressure |
|---|---|---|---|---|
| A100 | 0:00 | 500 gpm | 20 ft | 75 psi |
| A100 | 1:00 | 1000 gpm | 32 ft | 79 psi |
| A100 | 2:00 | 1500 gpm | 40 ft | 83 psi |
| A100 | 3:00 | 1500 gpm | 45 ft | 80 psi |

FIG. 3

WELLFIELD MANAGEMENT SYSTEMS AND METHODS

CROSS-REFERENCE TO RELATED APPLICATIONS

This application claims the benefit of U.S. Provisional Application No. 62/845,206, which was filed on May 8, 2019 and is hereby incorporated herein by reference in its entirety.

TECHNICAL FIELD

The disclosed technology relates generally to wellfield management systems and methods, and more particularly, some embodiments relate to wellfield management systems and methods involving a Supervisory Control and Data Acquisition (SCADA) system configured to monitor groundwater wells.

BACKGROUND

Wellfields are installed to extract water from the ground and generate a water supply. Alternately, wellfields may be installed to extract water from the ground for purposes of dewatering during construction and mining. Wellfields are often installed in association with an aquifer that will yield sufficient flow for a drinking water source. Many wellfields, however, are operated manually based on guessing an optimal pumping rate for each of the wellfield sites in the wellfield. At times, pumping systems are activated in an attempt pump water from the wellfield site, but the well efficiency might be diminishing for any number of unknown reasons. This causes inefficient use of the wellfields without guidance on how to increase efficiency. Better pumping methods are needed.

BRIEF SUMMARY OF EMBODIMENTS

According to various embodiments of the disclosed technology, the present application discloses a wellfield management system configured to perform real-time monitoring of groundwater wells. A Supervisory Control and Data Acquisition (SCADA) system, combined with well and wellfield analysis tools, provides guidance to decisionmakers for making decisions that optimize groundwater production from the wells while minimizing operating costs. The SCADA system continuously monitors the groundwater wells, including monitoring discharge rates and water-level changes.

According to various embodiments of the disclosed technology, the wellfield management system is an operational system combining real-time monitoring of groundwater wells and operational schedules. The system assists decisionmakers with maximizing groundwater production while minimizing costs. The system also assists decisionmakers with capital-improvement decision-making, including determining when to repair and replace water pumps and when to rehabilitate or replace groundwater wells.

In accordance with another embodiment of the disclosed technology, the wellfield management system may perform one or more methods described herein. For example, a computer-implemented method may comprise: receiving loop power data from instruments, wherein the loop power data is transmitted from a wellfield site pressure transducer associated with a wellfield site to a wellfield analysis system via a SCADA system, and wherein the loop power data comprises a discharge rate of the wellfield site. The method may further comprise initiating a step drawdown test of well efficiency using the loop power data, the discharge rate of the wellfield site, and a water level of the wellfield site. The method may further comprise transmitting a command signal to alter pumping of the wellfield site based on the step drawdown test, wherein the command signal is transmitted via the SCADA system to the wellfield site.

In one embodiment, the loop power data may be transmitted from the wellfield site transducer automatically when the wellfield site is powered on.

In one embodiment, the command signal may alter pumping of the wellfield site using a variable frequency drive associated with the wellfield site.

In accordance with another embodiment of the disclosed technology, the wellfield management system may comprise a plurality of groundwater wells; a plurality of field instruments, each associated with one or more of the plurality of groundwater wells; a plurality of remote terminal units, each in communication with one or more of the plurality of field instruments; a plurality of remote terminal unit communications systems, each in communication with one or more of the remote terminal units; a SCADA communications system in communication with the plurality of remote terminal unit communications systems; a SCADA system in communication with the SCADA communications system; and a wellfield analysis system in communication with the SCADA system.

In one embodiment, the SCADA system may be configured to monitor one or more of a well discharge rate, a water level, water pressure, and power consumed by the well pump motor measured by the plurality of field instruments.

In one embodiment, the wellfield management system may establish a feedback loop between the SCADA system and one or more of the plurality of groundwater wells.

In one embodiment, the SCADA system may be configured to send signals back, in real time, to one or more of the plurality of remote terminal units to start, stop, or vary a production rate of one or more water pumps associated with one or more of the plurality of groundwater wells.

In one embodiment, each of the plurality of groundwater wells may comprise a variable frequency drive controlling a well pump, or a modulating control valve on the well discharge, that can be started, stopped, or varied by one of the plurality of remote terminal units.

In one embodiment, the wellfield management system may further comprise a computer configured to run a remote pumping test on one or more of the plurality of groundwater wells. The remote pumping test can measure well efficiency, aquifer efficiency, and the electro-mechanical efficiency of the pump.

In one embodiment, the wellfield analysis system may be configured to perform an automated step drawdown test on startup of one or more of the plurality of groundwater wells. The wellfield analysis system may perform the automated step drawdown test by having the SCADA system send signals to the RTU associated with one of the plurality of groundwater wells, the signals causing a variable frequency drive associated with the groundwater well to engage in cyclic pumping. The automated step drawdown test may be run from a remote computer in communication with the SCADA system. Alternately, the automated step drawdown test may be run by having the SCADA system send signals to the RTU associated with one of the plurality of groundwater wells, the signals causing a modulating valve on the pump's discharge pipeline to open or close to maintain a specified flow rate during the step drawdown testing.

In one embodiment, the wellfield analysis system may be configured to determine a maximum sustainable well production for a period of time based upon one or more of the following factors: number of nearby pumping wells, regional hydrology, water quality, well discharge rate, water level, and water pressure. The maximum sustainable well production may be a well pumping rate that results in a specific capacity that does not decrease by more than 20 percent by the end of a predetermined sustainable yield period.

In one embodiment, the wellfield analysis system is configured to determine an annual operating cost of pumping based upon a well discharge rate, a well total lift, a number of hours pumped, an electrical power cost, and an overall plant efficiency.

In one embodiment, the wellfield analysis system is configured to determine an optimal discharge rate based upon the difference between revenue from water pumped and electrical and other costs of pumping water.

In one embodiment, the wellfield analysis system is configured to determine a period of time for a return on investment for performing well or pump rehabilitation or replacement.

In one embodiment, the wellfield analysis system is configured to run scenarios for making decisions on where and when to perform well or pump rehabilitation or replacement based upon one or more of the following factors: well and wellfield information, pump curves, electrical power costs, replacement well costs, well rehabilitation costs, and imported water costs.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein.

BRIEF DESCRIPTION OF DRAWINGS

The present disclosure, in accordance with one or more various embodiments, is described in detail with reference to the following figures. The drawings are provided for purposes of illustration only and merely depict typical or example embodiments. These drawings are provided to facilitate the reader's understanding of various embodiments and shall not be considered limiting of the breadth, scope, or applicability of the present disclosure. It should be noted that, for clarity and ease of illustration, these drawings are not necessarily made to scale.

FIG. 3 illustrates sample data received by the computing system to determine wellfield data and efficiency of a wellfield site, in accordance with an embodiment disclosed herein.

The figures are not intended to be exhaustive or to limit various embodiments to the precise form disclosed. It should be understood that various embodiments can be practiced with modification and alteration.

DETAILED DESCRIPTION OF THE EMBODIMENTS

Embodiments of the technology disclosed herein are directed toward wellfield management systems and methods. More particularly, some of the various embodiments of the technology disclosed herein relate to wellfield management systems and methods involving a SCADA system configured to monitor groundwater wells.

Figure 1:
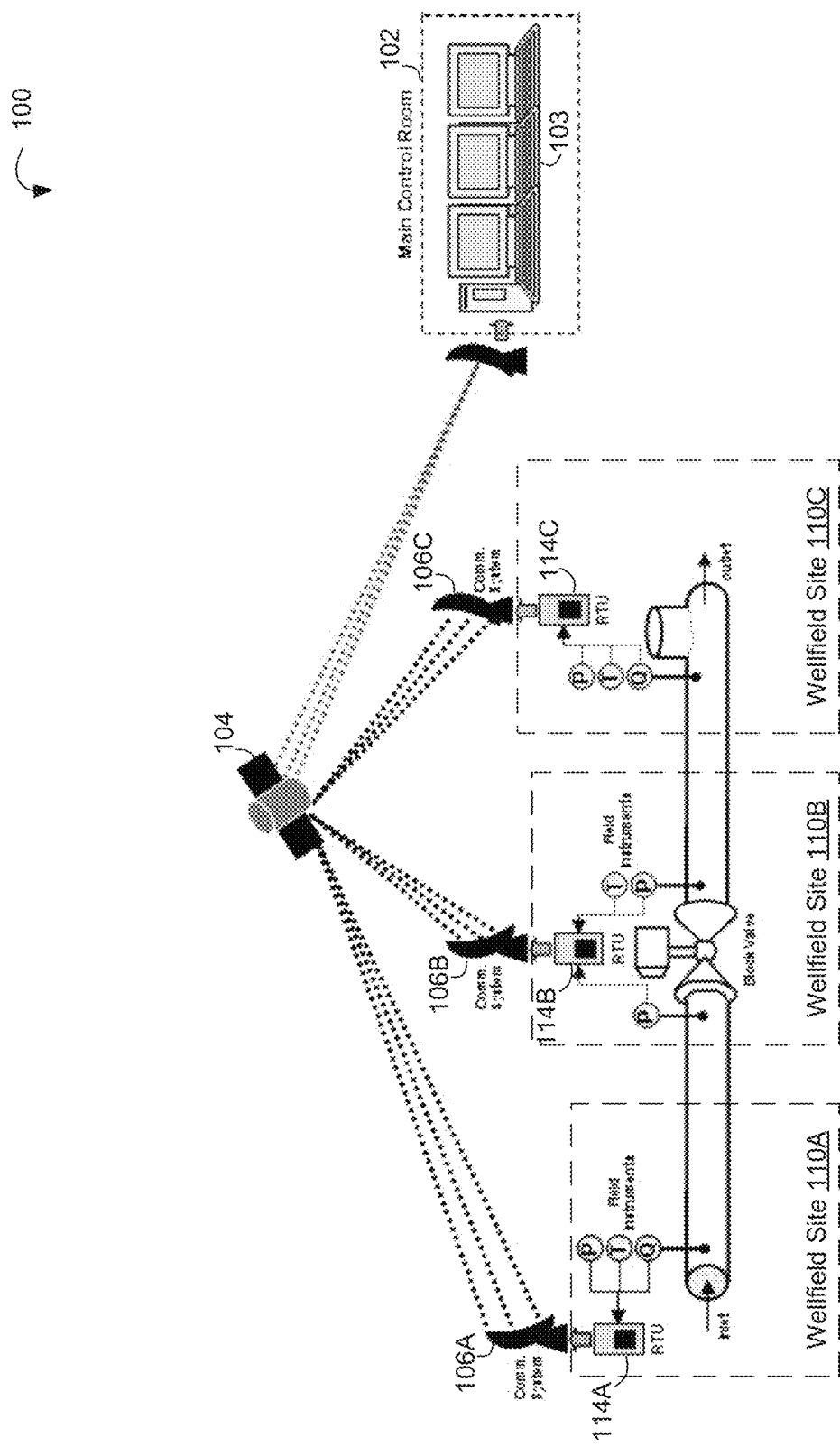
FIG. 1 illustrates a diagram of a wellfield management system that incorporates a computing system to continually measure wellfield data and efficiency of a wellfield site, in accordance with an embodiment disclosed herein.

FIG. 1 illustrates a diagram of a wellfield management system that incorporates a computing system to determine wellfield data and efficiency of a wellfield site, in accordance with an embodiment disclosed herein. In FIG. 1, a wellfield management system 100 is provided. The wellfield management system 100 can include a supervisory control and data acquisition (SCADA) system 102 in communication with various groundwater wells 110 (illustrated as 110A, 110B, and 110C). The SCADA system 102 may communicate via a cellular or radio SCADA communications system 104 to one or more communication systems 106 communicatively coupled with one or more of the groundwater wells 110.

In various embodiments, the wellfield management system 100 comprises a plurality of groundwater wells 110; a plurality of field instruments, each associated with one or more of the plurality of groundwater wells; a plurality of remote terminal units (RTU) 114 (illustrated as 114A, 114B, and 114C), each in communication with one or more of the plurality of field instruments; a plurality of RTU communications systems 106 (illustrated as 106A, 106B, and 106C), each in communication with one or more of the RTUs 114; a SCADA communications system 104 in communication with the plurality of RTU communications systems 106; a SCADA system 102 in communication with the SCADA communications system 104; and wellfield analysis system 103 in communication with the SCADA system 102. The SCADA system 102 is configured to monitor one or more of a well discharge rate, a water level of the groundwater table, a water pressure at the well discharge, and the power used by the pump motor to produce water, measured by the plurality of field instruments.

Figure 2:
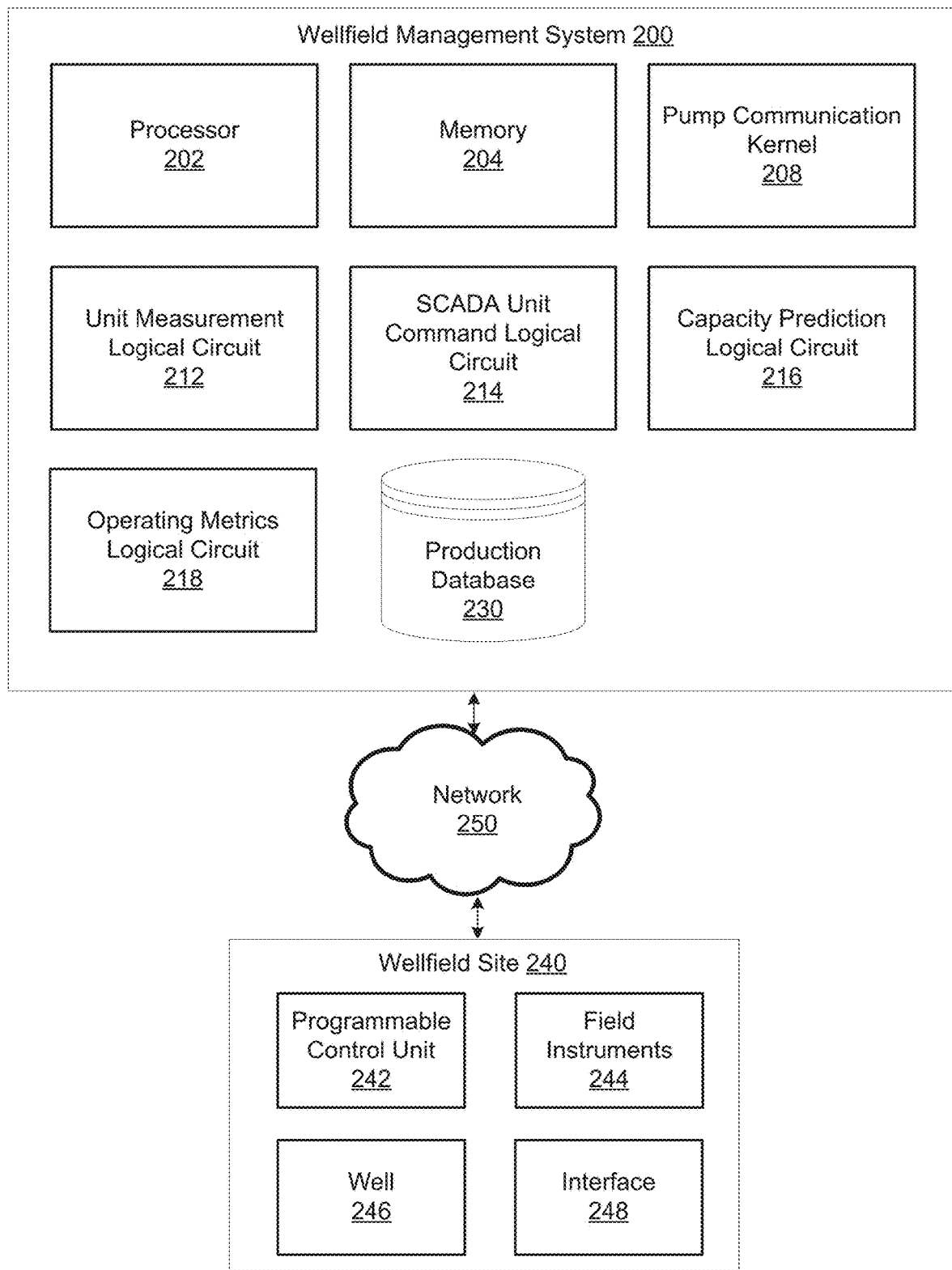
FIG. 2 illustrates a diagram of a computing system to determine wellfield data and efficiency of a wellfield site, including a production database and one or more SCADA units of the wellfield site, in accordance with an embodiment disclosed herein.

Additional detail of embodiments of the wellfield management system incorporated with one or more groundwater wells 110 is illustrated in FIG. 2. The wellfield management system 200 may comprise one or more wellfield sites 240.

The wellfield management system 200 may comprise a processor 202, a memory 204, a pump communication kernel 208, a unit measurement logical circuit 212, a SCADA unit command logical circuit 214, a capacity prediction logical circuit 216, an operating metrics logical circuit 218, and a production database 230.

The processor 202 executes computer-implemented instructions that are retrieved from the memory 204 to perform functions described throughout the disclosure. For example, the processor 202 may be configured to receive and process input data from one or more of the wellfield sites 240. The processor 202 may execute instructions that alter the operations of one or more of the wellfield sites 240 and process well data in real time.

The memory 204 is used for storing data and computer-implemented instructions for the processor 202. The memory 204 may include volatile memory such as random access memory (RAM), non-volatile read-only memory (ROM), and/or non-volatile memory such as complementary metal oxide semiconductor (CMOS) memory or electronically erasable programmable read-only memory (EEPROM).

The pump communication kernel 208 may communicate with the wellfield site 240 via a network 250 to determine the data produced by field instruments 244 at the wellfield site 240. The data may include well production reports, statistics, pump diagnostics, alerts, and other data identified by sensors incorporated into the field instruments 244. In some examples, the pump communication kernel 208 may act as a central functional unit either integrated locally into a well 246 at the wellfield site 240 or implemented remotely on the processor 202.

The unit measurement logical circuit 212 may receive data from the field instruments 244. The data may comprise well discharge rate, water level, water pressure, well total lift, number of hours pumped, electrical power cost, and overall plant efficiency measured by the plurality of field instruments 244. The unit measurement logical circuit 212 may associate sensor data with measurements of the well 246 at the wellfield site 240.

The SCADA unit command logical circuit 214 may generate a command signal to alter pumping at the wellsite. For example, the command signal may initiate an adjustment of a variable pump (e.g., a variable frequency drive (VFD)) that can be started, stopped, or varied by the associated RTU 114) at the wellsite to increase or decrease the pump flow. In some examples, the command signal may adjust the VFD or modulating valve in the well discharge in accordance with a step drawdown test such that the pump flow can be automatically reduced or stopped based on the system pressure sensed by the field instruments 244.

The capacity prediction logical circuit 216 may determine a specific capacity of a wellfield site based on various factors, including interference, increased well losses, lowering of static water levels or aquifer loss, and other factors described herein. The specific capacity may be determined by the formula:

$$B(t) \times Q + C \times Q^2 \text{ gpm/ft} \qquad (1)$$

where the discharge rate is Q gallons per minute (gpm), the aquifer loss is $B \times Q$, and the well loss is $C \times Q^2$.

The operating metrics logical circuit 218 may determine data based on an automated step drawdown test, including operating duration or timing, discharge rate, water level, and system pressure. The SCADA units may perform remote data polling and bidirectional data exchange.

The production database 230 may store data received from the wellfield site 240. One or more circuits may access the production database 230 to retrieve and analyze data that is stored within the production database 230.

The wellfield site 240 may correspond with a programmable control unit 242, the one or more field instruments 244, the well 246, and an interface 248. A plurality of wellfield sites 240 may be in communication with the wellfield management system 200 to transmit sensor data from the field instruments and receive instructions for automated operation of each corresponding well 246.

The programmable control unit 242 may correspond with the remote terminal units (RTU) 114 and/or variable frequency drives (VFD) that can be started, stopped, or varied by an associated RTU 114.

The field instruments 244 may comprise one or more well sensors for determining measurements associated with the well 246. Sensor input may comprise either discrete or continuous form, or an accommodation of both. Discrete input may be generated from photocells, pushing buttons, micro switches, limit switches, proximity switches, shaft encoders, optional scales, pressure switches, power meters, and the like. Continuous input may be generated from thermocouples, wellfield site transducers, voltmeters, and the like.

In some examples, the field instruments 244 may comprise loop power. For example, pressure, level, and flow devices may be loop-powered. The sensor data may comprise flow rate of abstracted water, surface pressure of the well discharge, and groundwater level, which may be transmitted via the network 250 to the wellfield management system 200.

The interface 248 may comprise a computer terminal with a keyboard and a monitor associated with the wellfield site 240. In some examples, the interface 248 may be implemented using a mobile device for accessing the data determined by the field instruments. In some examples, data are displayed locally at the wellfield site 240 without transmission via the network 250.

The network 250 may comprise the Internet, a Wide-Area Network (WAN), or a local-area network (LAN). Information is transferred via the network 250 using communication protocols known in the art. One illustrative example of a network 250 may include the SCADA communications system 104.

Returning to FIG. 1, the wellfield management system 100 establishes a feedback loop between the SCADA system 102 and one or more of the plurality of groundwater wells 110. The SCADA system 102 monitors wellfield parameters measured by the plurality of field instruments at each groundwater well 110, such as well discharge rate, water level elevation, water pressure, and other well and pump operational factors. The SCADA system 102 is configured to send signals back, in real time, to the plurality of RTUs 114 to start, stop, or otherwise adjust the production rate of the water pumps in the individual groundwater wells 110. In one embodiment, each of the plurality of groundwater wells comprises a variable frequency drive (VFD) that can be started, stopped, or varied by the associated RTU 114. In another embodiment, each of the plurality of groundwater wells comprises a SCADA-controlled valve on the well discharge that can be modulated to achieve a specified flow rate from the well.

The feedback loop can give water managers and operators the ability to run remote pumping tests from their computers, including laptops, workstations, and smart phones. For example, one parameter used to determine when to rehabilitate or replace a well is to measure the well efficiency. This test to measure well efficiency can be run remotely on a groundwater well equipped with a variable frequency drive and operatively connected to the SCADA system 102. Other well and wellfield tests can be run to optimize production from the wellfield sites.

In one embodiment, the wellfield analysis system 100 is configured to determine a maximum sustainable well production for a period of time based upon one or more of the following factors: number of nearby pumping wells, regional hydrology, water quality, well discharge rate, water level, and water pressure. The maximum sustainable well production may be a well pumping rate that results in a specific capacity that does not decrease by more than 20 percent by the end of the sustainable yield period, for example, 100 days.

In one embodiment, the wellfield analysis system 100 is configured to determine an annual operating cost of pumping based upon a well discharge rate, a well total lift, a number of hours pumped, an electrical power cost, and an overall plant efficiency. The wellfield analysis system is also configured to determine an optimal discharge rate based upon the difference between the revenue from water pumped and the cost of pumping.

In one embodiment, the wellfield analysis system 100 is further configured to determine a period of time for a return on investment for performing well or pump rehabilitation or replacement. The wellfield analysis system 100 is further configured to run scenarios for making decisions on where and when to perform well or pump rehabilitation or replacement based upon one or more of the following: well and wellfield information, pump curves, electrical power costs, replacement well costs, well rehabilitation costs, and imported water costs.

FIG. 3 illustrates sample data received by the computing system to determine wellfield data and efficiency of a wellfield site, in accordance with an embodiment disclosed herein. In some embodiments, the wellfield analysis system 100 is configured to perform an automated step drawdown test or automated constant rate pumping test on startup of a groundwater well to generate data similar to data provided in illustration 300.

To perform the automated step drawdown test, the SCADA system 102 sends signals via the SCADA communications system and the RTU communications system 106 to the RTU associated with the groundwater well, which causes the variable frequency drive associated with the groundwater well to engage in cyclic pumping. A field instrument associated with the groundwater well measures the drawdown of the groundwater well and sends data indicative of the drawdown measurements back to SCADA system 102. In one embodiment, the automated step drawdown test can be run from a remote computer in communication with the SCADA system 102.

In some examples, the wellfield management system 200 may automatically determine data from the wellfield site 240 through the automated step drawdown test. For example, the wellfield management system 200 may initiate the automated step drawdown test for a particular wellfield site 302 to determine a discharge rate 306, a water level 308, and a system pressure 310 at a predetermined interval of time 304. The water level changes may be determined by calculating a difference in water level 308 in accordance with each corresponding time 304.

In illustration 300, the wellfield management system 200 can receive the discharge rate 306, the water level 308, and the system pressure 310 from the field instruments 244. The discharge rate 306, the water level 308, and the system pressure 310 can be used to determine the sustainable yield for any operational period with any specific combination of variables. For example, any decreased discharge rate (e.g., production of water) from a wellfield site 240 may be attributed to the data determined. As a sample illustration, the wellfield site 240 may be determined to run 75 percent of the time or 18 hours per day to minimize the production cost of water, and the data determined by the system can be received and analyzed. Data from these pumping times can correlate a cause of the sustainable yield of water production at that rate.

Figure 4:
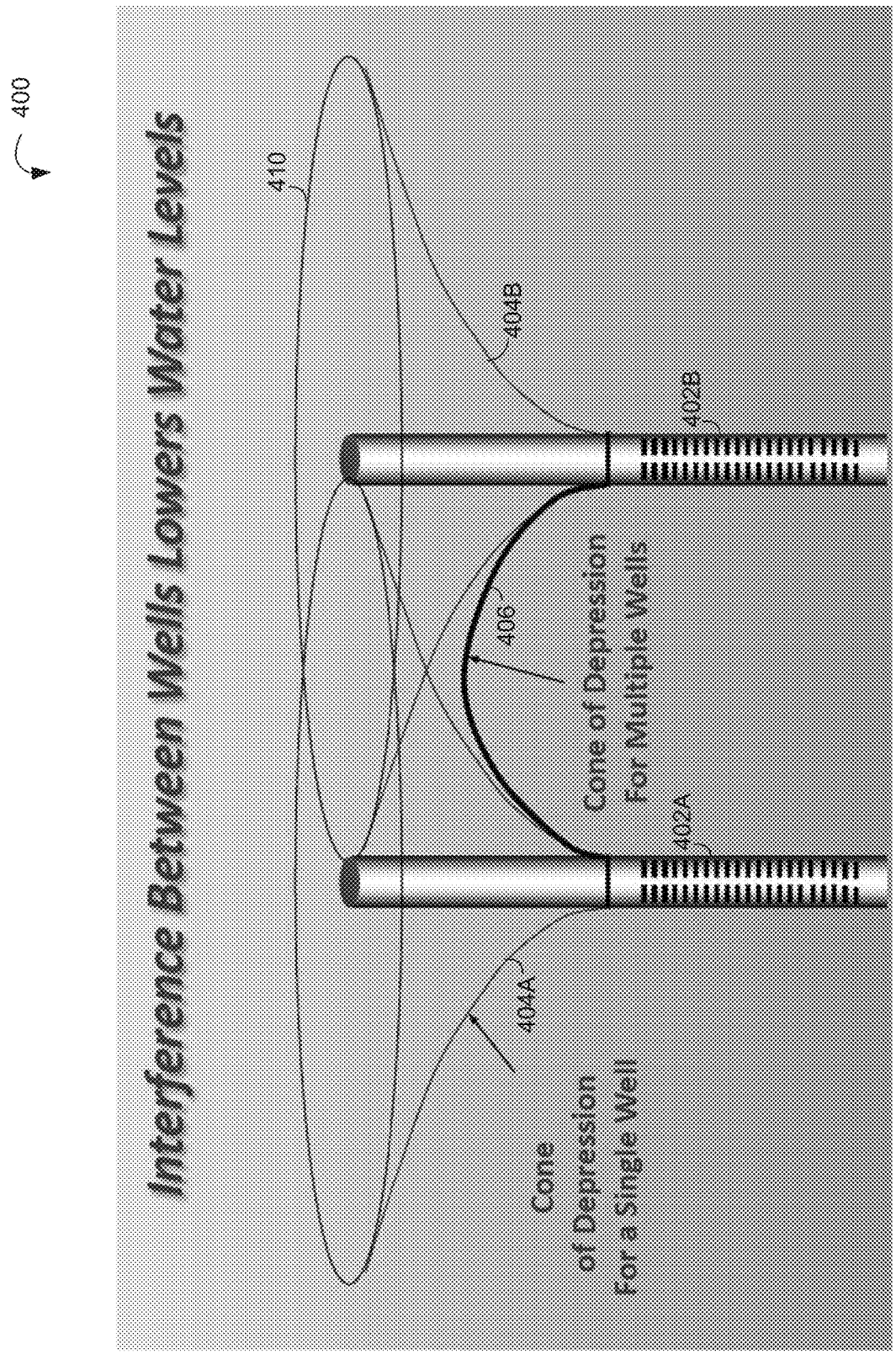
FIG. 4 illustrates a sample wellfield site, in accordance with an embodiment disclosed herein.

FIG. 4 illustrates a sample wellfield site, in accordance with an embodiment disclosed herein. In illustration 400, two wellfield sites 402 (illustrated as 402A and 402B) are provided. Each wellfield site corresponds with a cone of depression 404 (illustrated as 404A and 404B). A static non-pumping level 410 is illustrated to identify an estimated surface area corresponding with each well. When pumping commences, the overlap of the pumping areas corresponding to the two wellfield sites can cause a greater cone of depression 406 for the combined wellfield sites. This greater area may affect the determined water level 308 and other data received by the wellfield management system 200.

Figure 5:
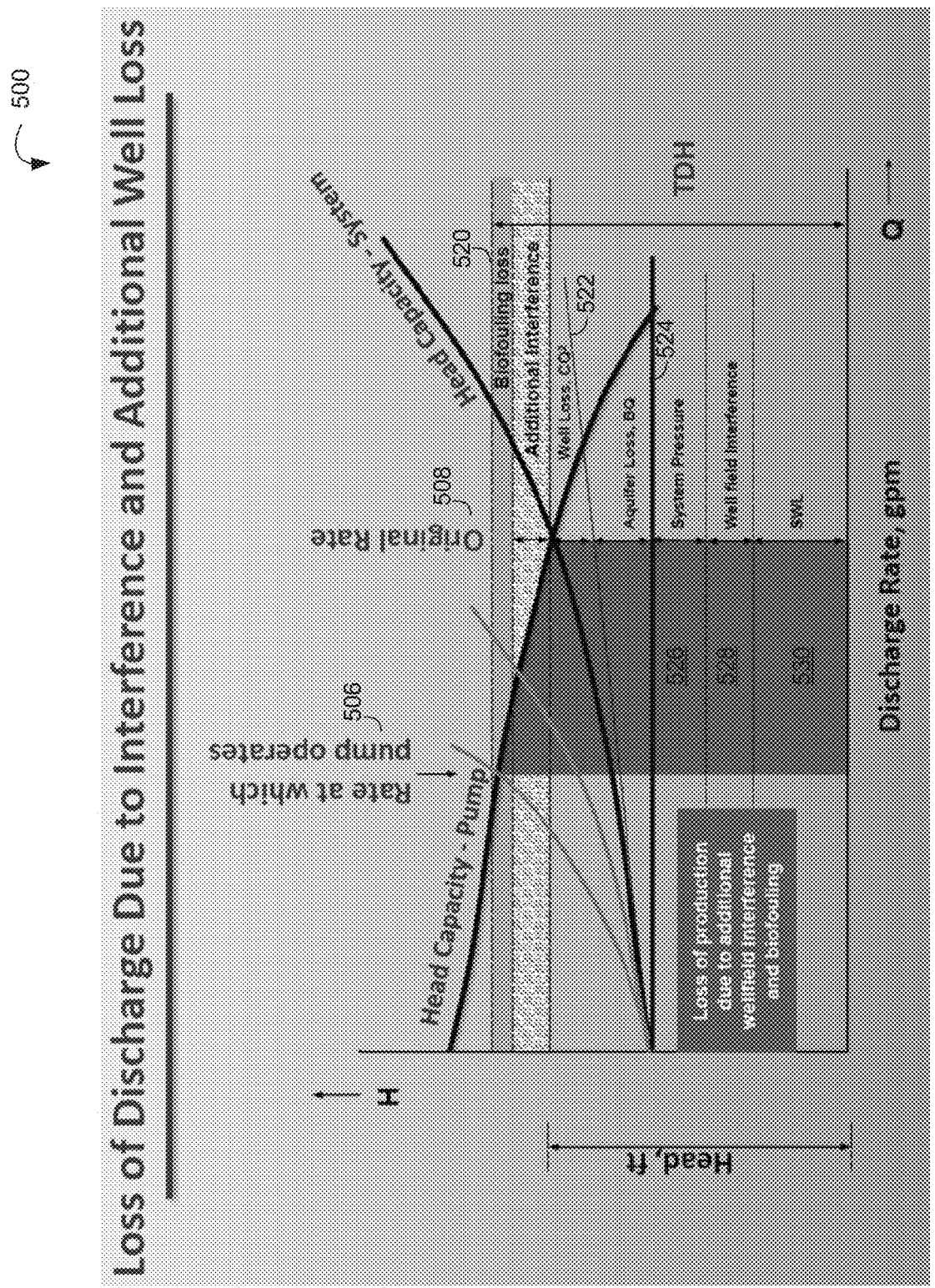
FIG. 5 illustrates sample factors that can effect wellfield efficiency at a wellfield site, in accordance with an embodiment disclosed herein.

FIG. 5 illustrates sample factors that can affect the wellfield efficiency at a wellfield site, in accordance with an embodiment disclosed herein. In illustration 500, a well operator may adjust the throughput of the pump or the throughput of the well in order to adjust the total water discharged from the wellsite. Using the data determined from the field instruments 244 and determinations from the wellfield management system 200, a determination of the cause of any decreased discharge rate can be determined.

For example, the pump at the wellfield site may wear over time resulting in lower power use efficiency, which is calculated and mapped in accordance with the determined discharge rate 506 as shown in illustration 500. By replacing the pump, the estimated discharge rate attained by the pump may be increased to correspond closer with the original discharge rate 508.

Various other factors may also decrease the discharge rate even with a replaced pump, including biofouling loss 520, well loss 522, aquifer loss 524, system pressure 526, wellfield interference 528 from other sites, and the like. The wellfield management system 200 may determine a combination of these factors and other factors that have the most effect on decreasing the discharge rate from the static water level 530. The set of factors may be determined to identify the most cost-effective way to increase the discharge rate in view of the cost of remedying these factors (e.g., return on investment).

The biofouling loss 520 may correspond with fouling of perforations in the well for entrance of water and the surrounding filter pack such as by iron bacteria or other indigenous microorganisms. An increased buildup of the organisms can decrease the discharge rate of the well. To remedy biofouling, the well may be cleaned to remove the organisms and recover or increase some of discharge rate.

The well loss 522 may correspond with linear and non-linear water losses. Linear well losses may be caused by damage to the aquifer during drilling and completion of the well. They comprise, for example, water losses due to compaction of the aquifer material during drilling, losses due to plugging of the aquifer with drilling mud (which can reduce the permeability near the bore hole), losses in the gravel pack, and losses in the screen. Non-linear well losses may include friction losses that occur inside the well screen and in the suction pipe where the flow is turbulent, and the losses that occur in the zone adjacent to the well where the flow is also usually turbulent. To remedy well loss, the well and surrounding material may be repaired.

The aquifer loss 524 may correspond to the water losses that occur in the aquifer, including losses that occur because of drought or other constant reduction in the aquifer water level. The aquifer loss may correspond to time-dependent variance of the water level and vary linearly with the well discharge. To remedy aquifer loss, an increase in the water level of the aquifer may be required (e.g., through a rain storm or providing water from a third-party source).

The system pressure 526 may correspond to pumping the water at an elevation higher than the original location in the aquifer or well. For example, the system pressure factor may identify pumping the water from an original elevation to the static non-pumping level 410. Additional elevation considerations may be considered, including pumping the water from the static non-pumping level 410 to a pressurized pipe or to a water storage reservoir to elevate the pumped water even higher.

The wellfield interference 528 from other sites may correspond to water pumped by other wells within a proximate distance of a particular well. The wellfield management system 200 may identify the greater cone of depression 406 as interference from these proximate wellfield sites. To remedy wellfield interference from other sites, a subset of wells may be operated so that the cone of depression from each well does not interfere with proximate wellfield sites. The pumping for a first wellfield site may correspond to a first schedule, and the pumping for a second wellfield site within a proximate distance of the first wellfield site may correspond to a second schedule, such that the first schedule and the second schedule do not overlap.

The factors affecting the discharge rate may be used to create a virtual model of the well, coupling the head capacity curve of the pump with the head capacity curve of the system as shown in FIG. 5. In FIG. 5, the head capacity curve of the system is matched with the head capacity curve of the pump to give the well operator a sense of the factors that are affecting the discharge rate. As shown in FIG. 5, the system pressure 526, the wellfield interference from other sites 528, and the static water level 530 determine the head capacity of the system at a zero discharge rate. As the pump is turned on and drawdown occurs, the well loss 522 and the aquifer loss 524 come into play according to the specific capacity formula (1) given above. For the pump, the head capacity curve is generally given by the formula $H = a + bQ + cQ^2$, where a, b, and c are constants for a given speed of the pump. These constants, however, can change over time as the pump undergoes wear and tear.

As shown in FIG. 5, the point at which the head capacity curve of the pump crosses the head capacity curve of the system gives the discharge rate at which the well will operate. If there is no biofouling loss 520 or additional interference due to additional wells in the wellfield, then the head capacity curve of the pump crosses the head capacity curve of the system crosses farther to the right along the horizontal axis, denoted in FIG. 5 as the original discharge rate 508. If there is no biofouling loss 520 but there is additional interference due to additional wells in the wellfield, then the head capacity curve of the pump crosses the head capacity curve of the system farther to the left along the horizontal axis. If there is both biofouling loss 520 and additional interference due to additional wells in the wellfield, then the head capacity curve of the pump crosses the head capacity curve of the system even farther to the left along the horizontal axis, denoted in FIG. 5 as the determined discharge rate 506. In general, as there is more biofouling loss 520 and more additional interference due to additional wells in the wellfield, then the head capacity curve for the system moves up along the vertical axis, and the production of the well goes down.

Changes in the efficiency of the pump will move points along the head capacity curve of the pump either up or down along the vertical axis, effectively moving the crossing point of the head capacity curve of the pump and the head capacity curve of the system either to the left or to the right along the horizontal axis, and thus changing the discharge rate. In general, as the pump wears, the head capacity curve for the pump moves down along the vertical axis, and the production of the well goes down.

The virtual well model shown in FIG. 5 thus can give the well operator a sense of the factors that are affecting the discharge rate and an indication of how a well might be most cost-effectively rehabilitated to improve the discharge rate. The model allows the well operator to get better clarity on how much each factor is contributing to decreases in the discharge rate. This helps the well operator to get a better understanding of how much additional water will be obtained if the pump is rehabilitated versus how much additional water will be obtained if the well is rehabilitated, giving a clearer sense of the return on investment.

This also helps the well operator to determine, in real time, when to rehabilitate the well due to biofouling, sand sealing, encrustations, etc. and when to replace the pump. To help determine when to replace the pump, the present efficiency of the pump impellers due to impeller or shaft wear can be compared to the efficiency when the pump was new. Embodiments of the well-management system disclosed herein offer the ability to remotely measure well and pump parameters, as well as control these parameters in real time via a SCADA system. This allows the well operator to make real-time decisions while avoiding the cost of sending personnel to the wellfield to manually run tests.

Figure 6:
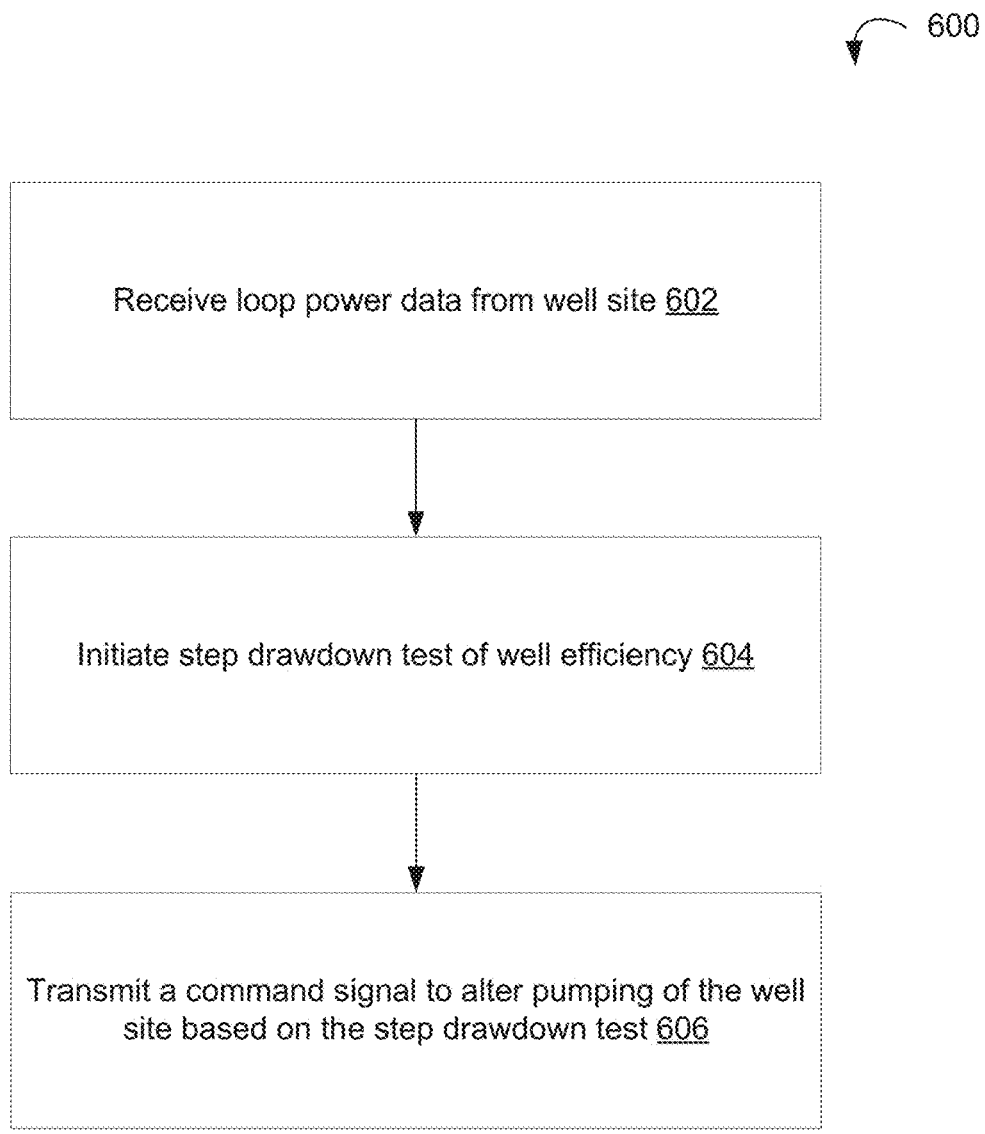
FIG. 6 illustrates a method to determine wellfield data and efficiency of a wellfield site, in accordance with an embodiment disclosed herein.

FIG. 6 illustrates a method to determine wellfield data and efficiency of a wellfield site, in accordance with an embodiment disclosed herein. In illustration 600, a wellfield management system executes instructions to perform the computer-implemented steps provided herein.

At block 602, loop power data may be received. For example, the wellfield management system 200 may receive loop power data from a wellfield site 240. The loop power data may be transmitted from a wellfield site transducer associated with a wellfield site to a wellfield analysis system via a SCADA system. The loop power data may comprise a discharge rate of the wellfield site.

At block 604, a step drawdown test may be initiated. For example, the wellfield management system 200 may initiate a step drawdown test of well efficiency using the loop power data, the discharge rate of the wellfield site, and a water level of the wellfield site.

At block 606, a command signal may be transmitted to the wellfield site 240. For example, the wellfield management system 200 may transmit the command signal to alter pumping of the wellfield site based on the step drawdown test. The command signal may be transmitted via the SCADA system to the wellfield site.

Figure 7:
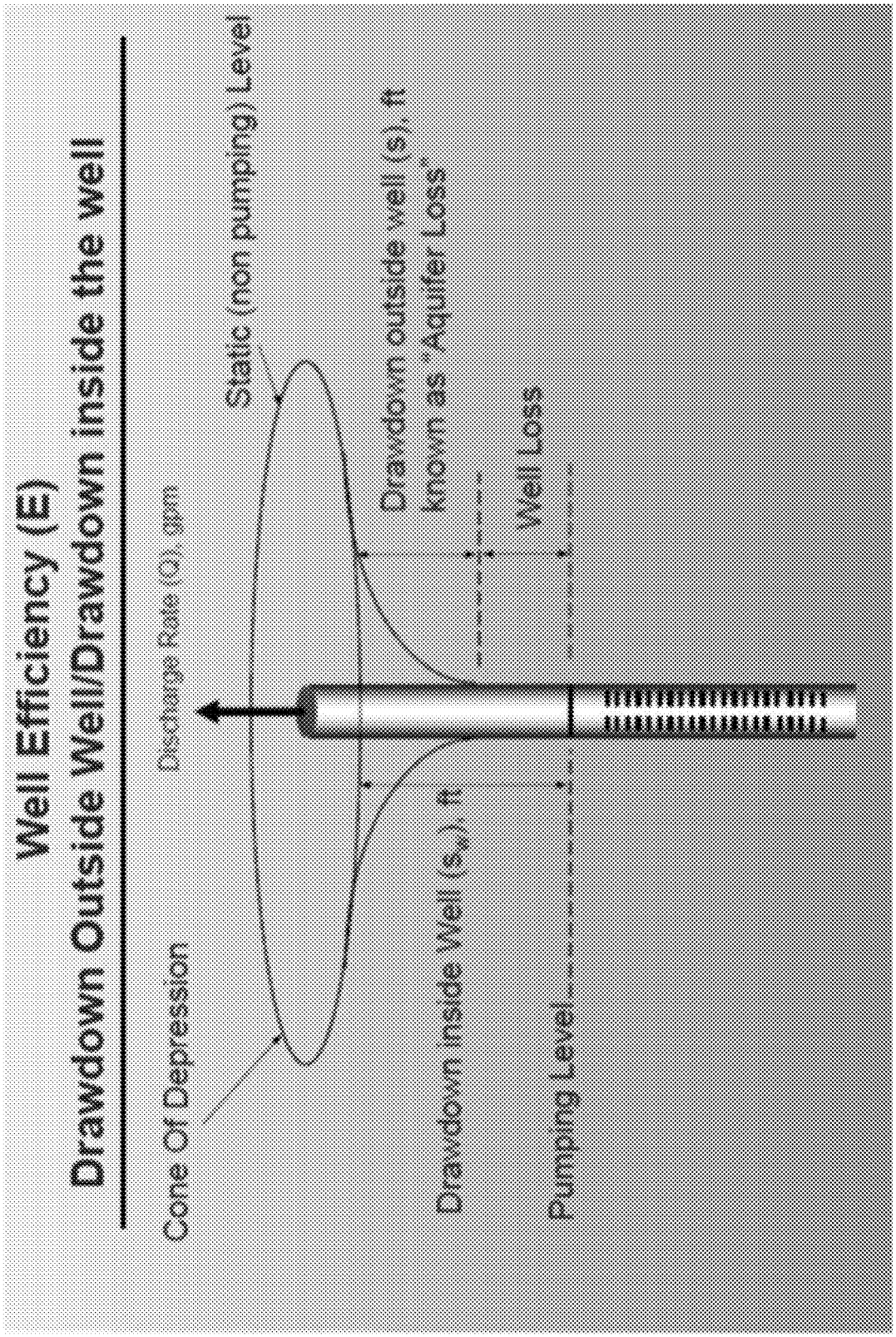
FIG. 7 is a diagram of a well, illustrating how the drawdown $s_w$ inside the well (the difference between the pumping level and the static, non-pumping level) is a function of the drawdown s outside the well (the aquifer loss) and the well-related hydraulic loss that occurs as water flows through the well filter pack, well screen, and well bore.

FIG. 7 is a diagram of a well, illustrating how the drawdown $s_w$ inside the well (the difference between the pumping level and the static, non-pumping level) is a function of the drawdown s outside the well (the aquifer loss) and the well loss.

Figure 8:
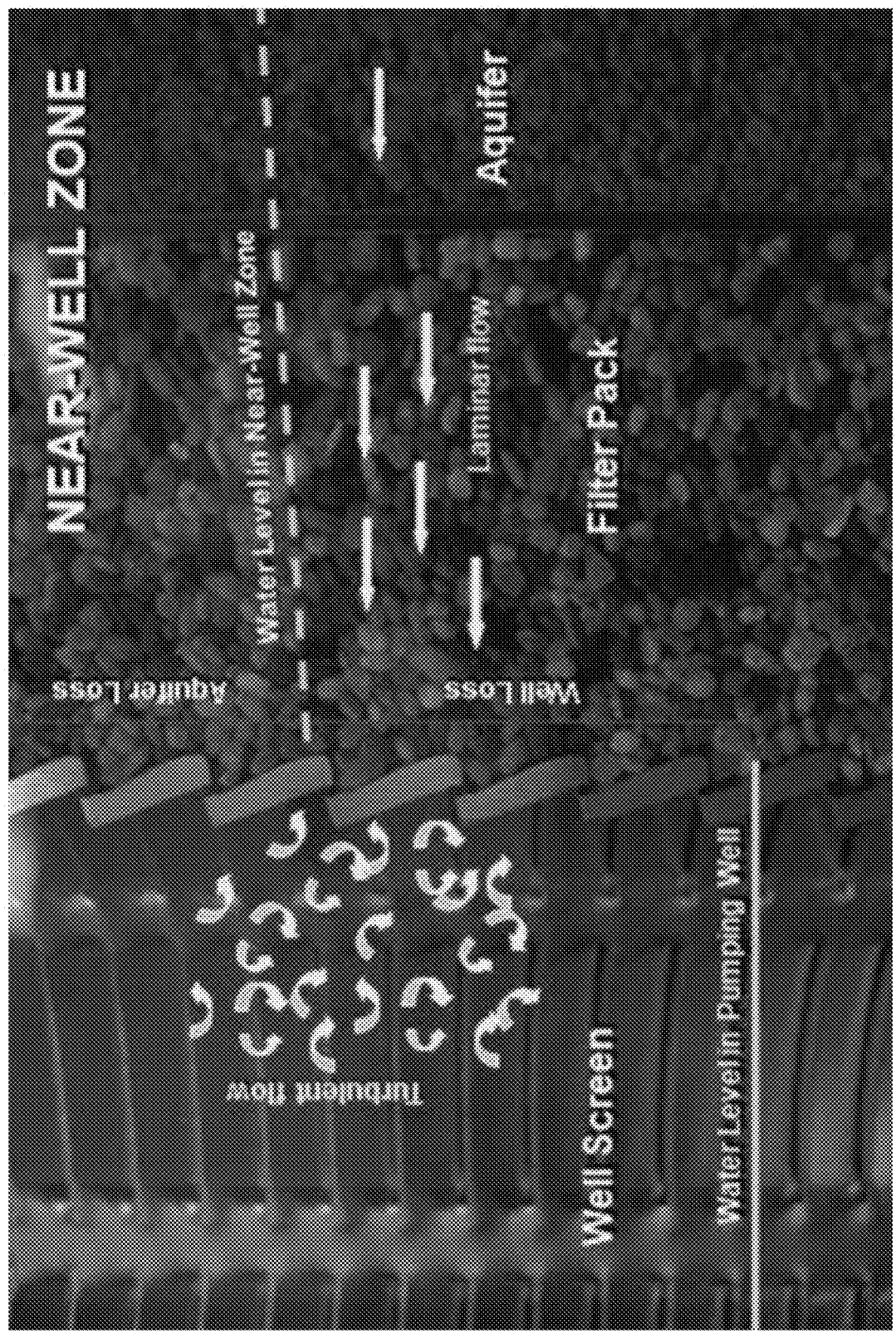
FIG. 8 is a close-up view of a portion of a well and a near-well zone, illustrating the flow of water from an aquifer, through a filter pack and a well screen, and into a well.

FIG. 8 is a close-up view of a portion of a well and a near-well zone, illustrating the flow of water from an aquifer, through a filter pack and a well screen, and into a well.

Figure 9:
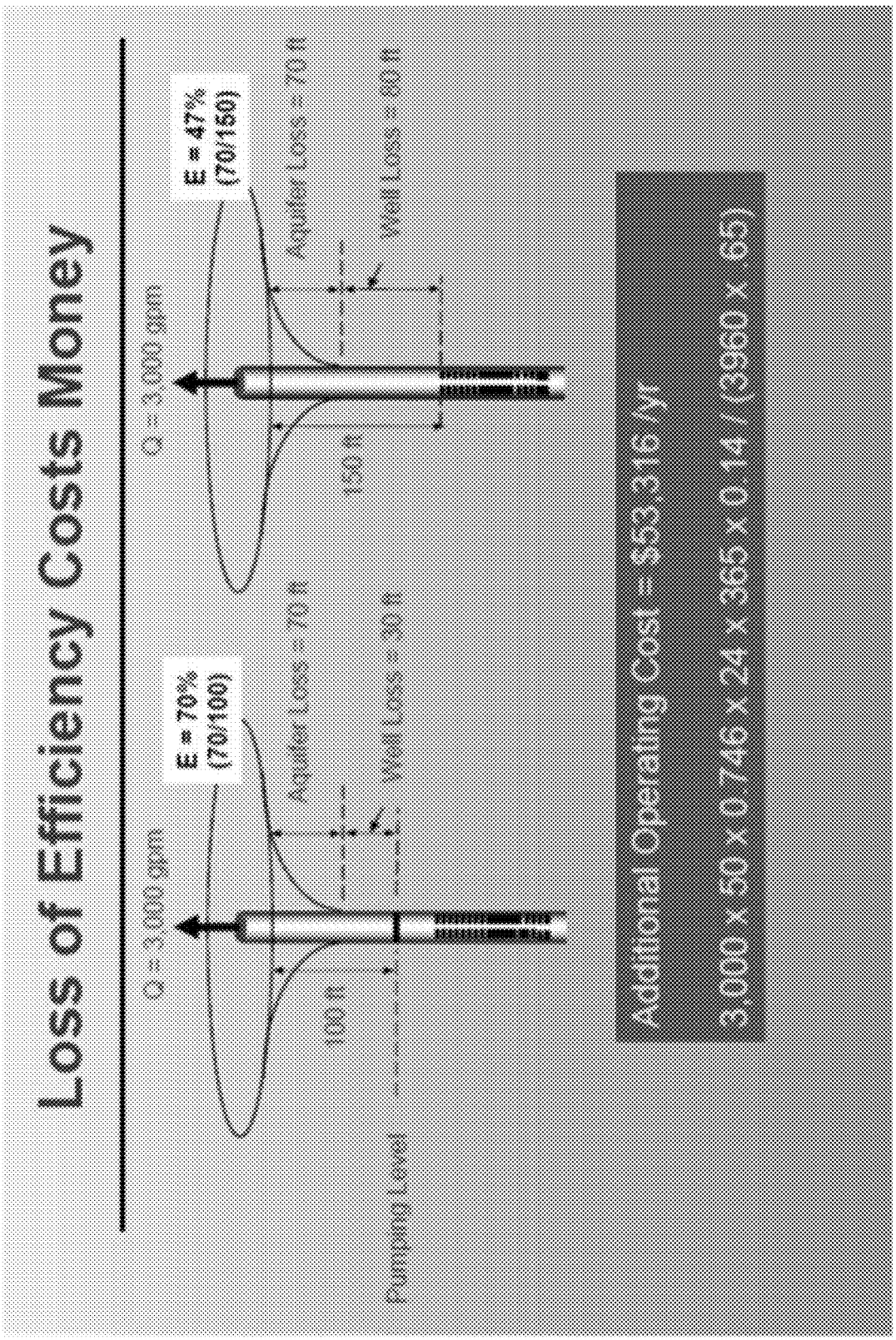
FIG. 9 is a diagram showing two wells to illustrate how the loss of well efficiency due to well loss (30 feet for the left well versus 80 feet for the right well) can result in additional operating costs to the operator of a well.

FIG. 9 is a diagram showing two wells to illustrate how the loss of well efficiency due to well loss (30 feet for the left well versus 80 feet for the right well) can result in additional operating costs to the operator of a well. The additional operating cost resulting from a higher pumping lift is provided by the following formula: Q (well discharge rate)× δH (difference in total lift)×0.746×hours pumped per year×C (electrical power cost per kilowatt hour)/(3960×$e_0$ (overall plant efficiency)).

Figure 10:
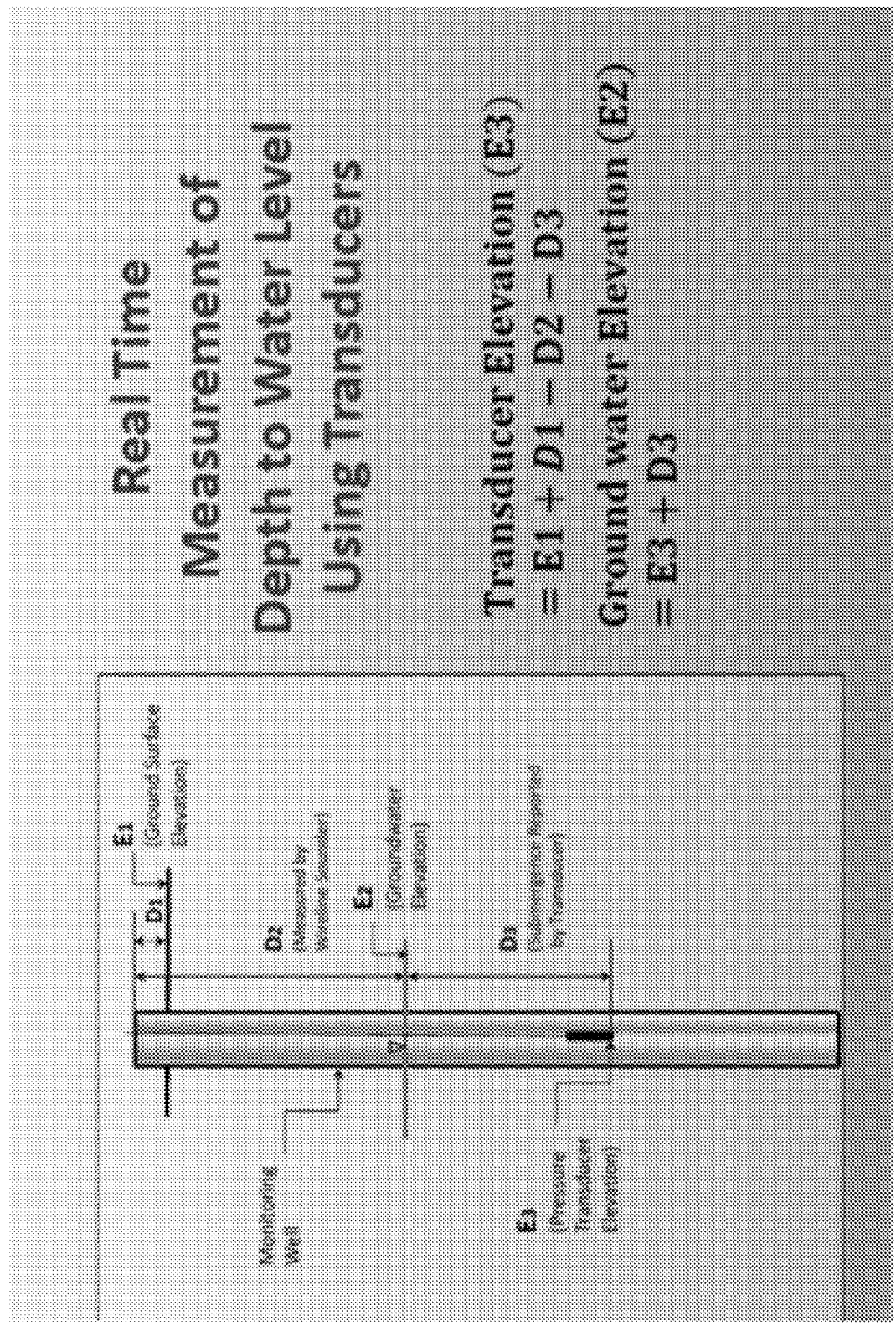
FIG. 10 is a diagram of a well, illustrating the use of a pressure transducer to measure, in real time, the depth from the ground surface elevation $E_1$ to both the groundwater elevation $E_2$ in the aquifer and the water level $E_3$ inside the well.

FIG. 10 is a diagram of a well, illustrating the use of a pressure transducer to measure, in real time, the depth from the ground surface elevation $E_1$ to both the groundwater elevation $E_2$ in the aquifer and the water level $E_3$ inside the well. The water level $E_3$ inside the well is provided by the equation $E_3=E_1+D_1-D_2-D_3$, where $E_1$ is the ground surface elevation, $D_1$ is the distance from the top of the well to the ground surface elevation $E_1$, $D_2$ is the distance measured by a wireline sounder from the top of the well to the groundwater elevation $E_2$ in the aquifer, and $D_3$ is the distance as reported by the pressure transducer from the groundwater elevation $E_2$ to the water level $E_3$ inside the well. The groundwater level $E_2$ in the aquifer is provided by the equation $E_2=E_3+D_3$, where $E_3$ is the water level inside the well as provided by the above equation. Alternatively, the groundwater level $E_2$ in the aquifer is provided by the equation $E_2=E_1+D_1-D_2$.

Figure 11:
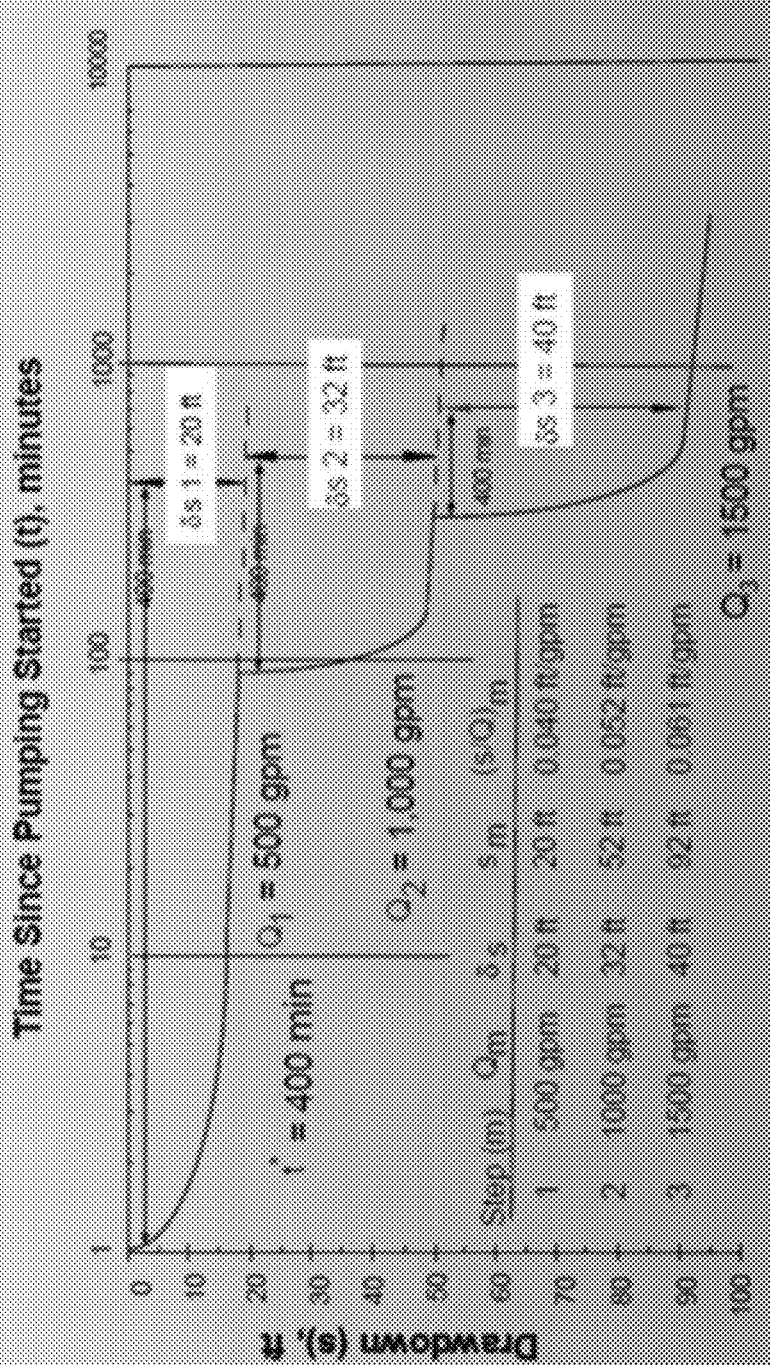
FIG. 11 is a chart showing the results of an example step drawdown test, in accordance with an embodiment disclosed herein.

FIG. 11 is a chart showing the results of an example step drawdown test, in accordance with an embodiment disclosed herein. In step 1 of the step drawdown test, a variable frequency drive (adjusted by the command signal generated by the SCADA unit command logical circuit 214 of FIG. 2) is operated at a level that produces a well discharge rate $Q_1$ of 500 gpm for a period of time. Meanwhile, the drawdown Si inside the well (the difference between the pumping level and the static, non-pumping level) is measured as a function of the time after the start of pumping for step 1. At a certain point, the drawdown Si as a function of time becomes a linear function, and the drawdown Si can be extrapolated to a predetermined future time, for example, 400 minutes after the start of step 1. The drawdown Si and the specific drawdown ($s_1/Q_1$) can then be calculated at that predetermined future time. In FIG. 11, the drawdown Si is 20 feet after 400 minutes and the specific drawdown $s_1/Q_1$ after 400 minutes is 0.040 ft/gpm.

In step 2 of the step drawdown test, the variable frequency drive is operated at a level that produces a well discharge rate $Q_2$ of 1,000 gpm for a period of time. Meanwhile, the drawdown $s_2$ inside the well is measured as a function of the time after the start of pumping for step 2. At a certain point, the drawdown $s_2$ as a function of time becomes a linear function, and the drawdown $s_2$ (as well as the difference δs between the drawdown $s_2$ and the drawdown $s_1$) can be extrapolated to a predetermined future time, for example, 400 minutes after the start of step 2. The drawdown $s_2$, the drawdown difference δs, and the specific drawdown ($s_2/Q_2$) can then be calculated at that predetermined future time. In FIG. 11, the drawdown $s_2$ is 52 feet after 400 minutes, the drawdown difference δs is 32 feet after 400 minutes, and the specific drawdown $s_2/Q_2$ after 400 minutes is 0.052 ft/gpm.

In step 3 of the step drawdown test, the above process is repeated, except that the variable frequency drive is operated at a level that produces a well discharge rate $Q_3$ of 1,500 gpm for a period of time.

Figure 12:
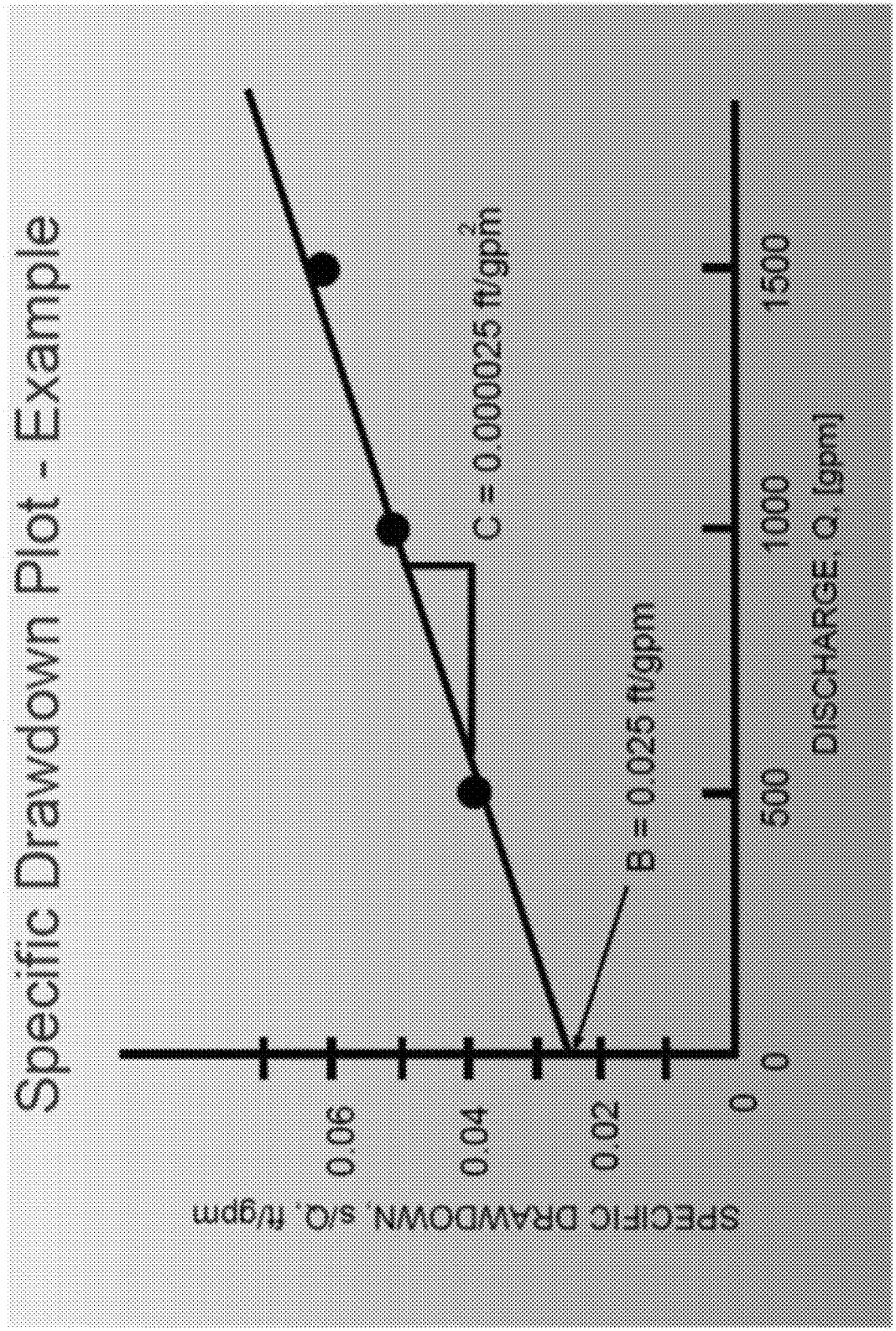
FIG. 12 is a chart showing an example specific drawdown plot of the specific drawdown data shown in FIG. 11.

FIG. 12 is a chart showing an example specific drawdown plot of the specific drawdown data shown in FIG. 11. As shown, a straight line can be fitted through the observed data. The slope of the fitted line gives the well loss C (here, 0.000025 ft/gpm). The intercept of the fitted line with Q=0 gives the aquifer loss B (here, 0.025/gpm).

Figure 13:
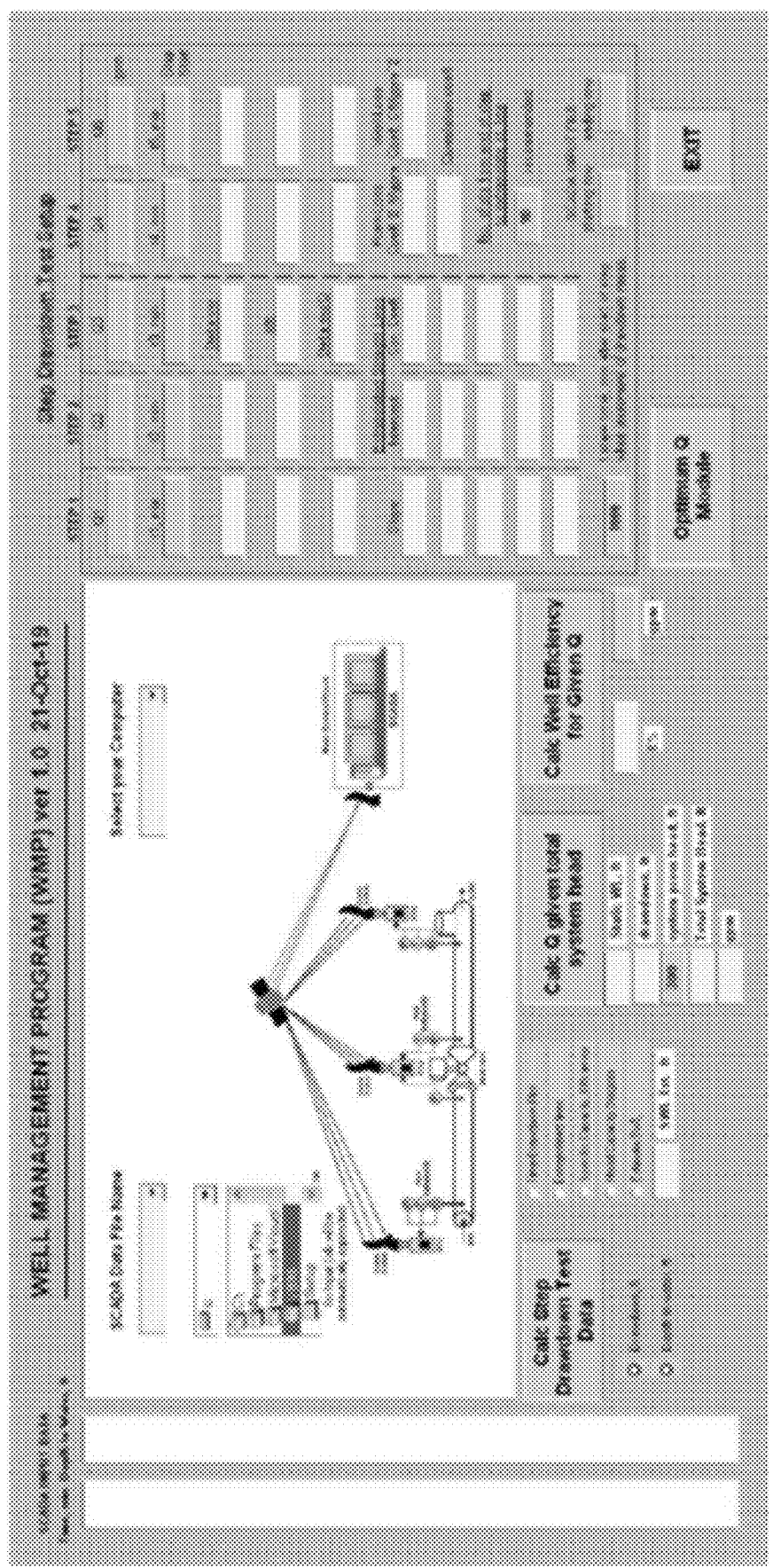
FIG. 13 shows a user interface of a well management program, in accordance with an embodiment disclosed herein.

FIG. 13 shows a user interface of a well management program, in accordance with an embodiment disclosed herein. On the right side of the user interface, a user may set up a step drawdown test having a number of steps by entering inputs for the well discharge rates Q (in gpm) and the start times t (in minutes) for each step. The user may also enter an input for the number of minutes after the start of the step when the drawdown is to be calculated.

The user may then start the step drawdown test by selecting the "Calc Step Drawdown Test Data" button on the left side of the user interface. This causes the the SCADA unit command logical circuit 214 of FIG. 2 to generate a command signal to adjust the variable frequency drive of the well being tested according to the inputs set by the user. After the step drawdown test is started, SCADA input data in the form of drawdown or depth-to-water information is collected and displayed on the left side of the user interface. On the right side of the user interface, the drawdown $s_m$ of each step, the drawdown difference δs (shown as "Delta sw") from the drawdown of the prior step, and the difference in the specific drawdown s/Q from the specific drawdown of the prior step are calculated and displayed. Also calculated and displayed on the right side of the user interface are the slope, intercept, and correlation coefficient of straight lines fitted through the data, along with a calculation of the aquifer loss coefficient B (shown as "Form Loss"), the well loss coefficient C, and the correlation coefficient.

On the user interface, the user may choose between radio buttons to display a time-drawdown plot, the extrapolated lines, the specific capacity efficiency, a head capacity diagram, and an estimate of the static water level (SWL). The user may also select the "Calc Q given total system head" button to calculate and display the well discharge rate at a given system pressure head based upon the step drawdown test data. Additionally, the user may select the "Cal Well Efficiency for Given Q" button to calculate and display the well efficiency percentage E % at a given well discharge rate based upon the step drawdown test data.

Figure 14:
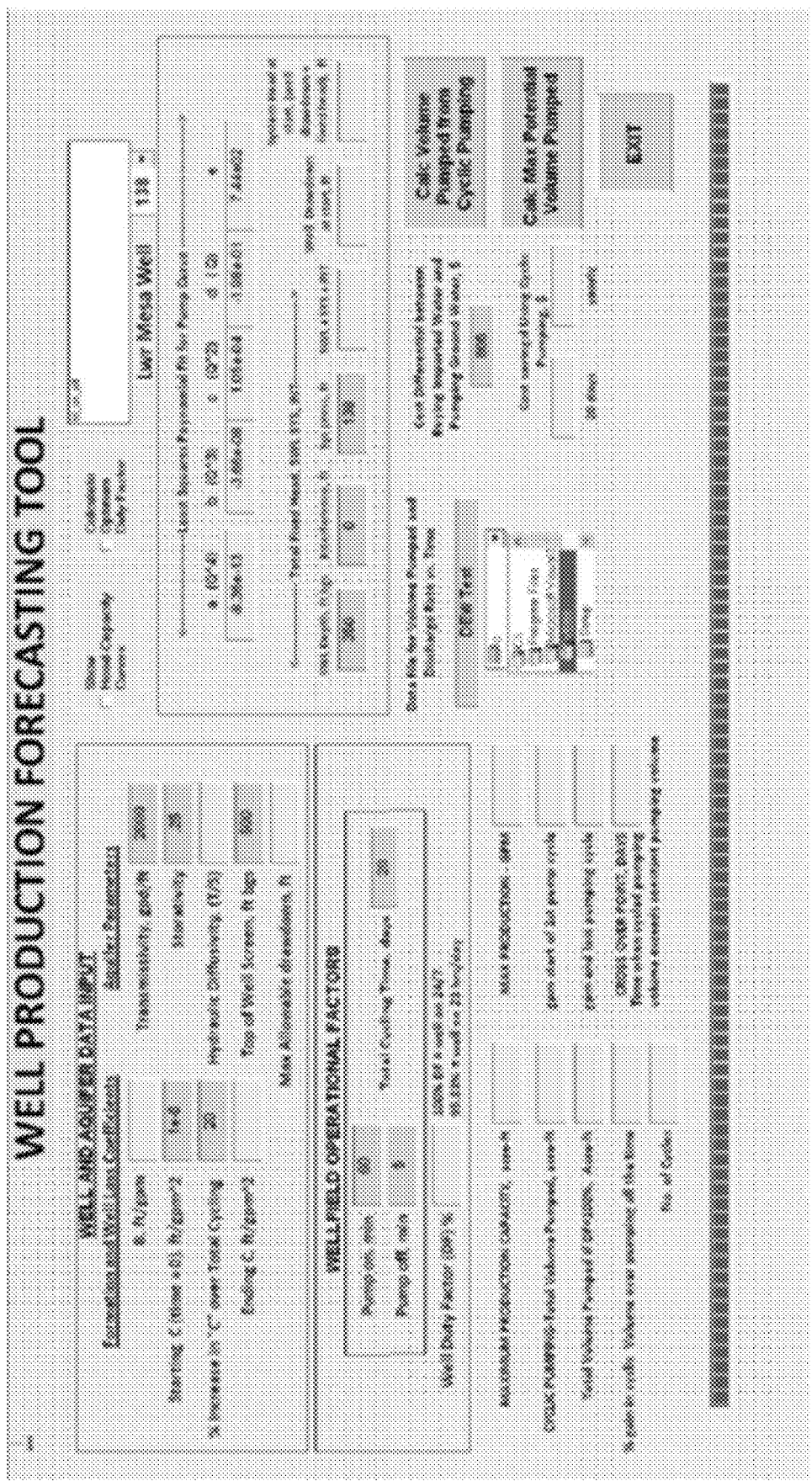
FIG. 14 shows a user interface of a well production forecasting tool for a well management program, in accordance with an embodiment disclosed herein.

FIG. 14 shows a user interface of a well production forecasting tool for a well management program, in accordance with an embodiment disclosed herein. Using data inputted by the user and the results of the step drawdown test described above, the well production forecasting tool can forecast the production capacity of a well, the total volume pumped if the well is subject to cyclic pumping (the well duty factor is less than 100 percent), the total volume pumped if the well is pumping continuously (the well duty factor is 100 percent), and the percent gain in volume if the well is subject to cyclic pumping versus pumping continuously. The well production forecasting tool can also forecast the maximum production rate of the well, the production rate of the well at the start of the first pumping cycle if the well is subject to cyclic pumping, the production rate of the well at the end of the last pumping cycle if the well is subject to cyclic pumping, and the cross-over point when the total volume pumped using cyclic pumping exceeds the total volume pumped using constant pumping. The well production forecasting tool can additionally calculate the optimum duty factor for the well and the cost savings of using cycling pumping over constant pumping. Using the historical data measured from the well efficiency, aquifer efficiency, and pump efficiency, the well production forecasting tool can use the measured historical changes in efficiency to forecast future well production based on these efficiency trends.

Although the disclosed technology is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

What is claimed is:

1. A wellfield management system comprising:
   a plurality of groundwater wells comprising
      a pumping well, and
      one or more wells adjacent to the pumping well;
   a plurality of field instruments, each associated with one or more of the plurality of groundwater wells,
      wherein one or more of the plurality of field instruments comprises a field instrument configured to measure water level and associated with the pumping well;
   a plurality of remote terminal units (RTUs), each in communication with one or more of the plurality of field instruments;
   a plurality of remote terminal unit (RTU) communications systems, each in communication with one or more of the plurality of RTUs;
   a Supervisory Control and Data Acquisition (SCADA) communications system in communication with one or more of the plurality of RTU communications systems;
   a SCADA system in communication with the SCADA communications system; and
   a wellfield analysis system in communication with the SCADA system;
   wherein the pumping well and each of the one or more wells adjacent to the pumping well comprise either a modulating valve or a variable frequency pump.

2. The wellfield management system of claim 1, wherein the SCADA system is configured to monitor one or more of a well discharge rate, a water level, a pump motor power, and a water pressure measured by the plurality of field instruments.

3. The wellfield management system of claim 1, wherein the wellfield management system establishes a feedback loop between the SCADA system and one or more of the plurality of groundwater wells.

4. The wellfield management system of claim 1, wherein the SCADA system is configured to send signals back, in real time, to one or more of the plurality of RTUs to start, stop, or vary a production rate of one or more water pumps associated with one or more of the plurality of groundwater wells.

5. The wellfield management system of claim 1, wherein the pumping well and each of the one or more wells adjacent to the pumping well comprise a modulating valve configured to be started, stopped, and varied by one of the plurality of RTUs.

6. The wellfield management system of claim 1, further comprising a computer configured to run a remote pumping test on one or more of the plurality of groundwater wells.

7. The wellfield management system of claim 6, wherein the remote pumping test measures well efficiency.

8. The wellfield management system of claim 1, wherein the wellfield analysis system is configured to perform an automated step drawdown test on startup of one or more of the plurality of groundwater wells.

9. The wellfield management system of claim 8, wherein:
   the pumping well and each of the one or more wells adjacent to the pumping well comprise a variable frequency pump;
   the wellfield analysis system performs the automated step drawdown test by having the SCADA system send signals to an RTU of the plurality of RTUs; and
   the signals cause the variable frequency pump associated with the pumping well and each of the one or more wells adjacent to the pumping well to engage in cyclic pumping.

10. The wellfield management system of claim 8, wherein the automated step drawdown test is run from a remote computer in communication with the SCADA system.

11. The wellfield management system of claim 8, wherein:
   the pumping well comprises a variable frequency pump;
   the automated step drawdown test is performed on the pumping well; and
   the automated step drawdown test comprises adjusting the variable frequency pump in accordance with one or more steps of the automated step drawdown test.

12. The wellfield management system of claim 1, wherein the wellfield analysis system is configured to determine a maximum sustainable well production for a period of time based upon one or more of the following factors: number of the one or more wells adjacent to the pumping well, regional hydrology, water quality, well discharge rate, water level, water pressure, short-term changes in aquifer water level, and long-term changes in aquifer water level.

13. The wellfield management system of claim 12, wherein the maximum sustainable well production is a well pumping rate that results in a specific capacity that does not decrease by more than 20 percent by the end of a predetermined sustainable yield period.

14. The wellfield management system of claim 1, wherein the wellfield analysis system is configured to determine an annual operating cost of pumping based upon a well discharge rate, a well total lift, a number of hours pumped, an electrical power cost, and an overall plant efficiency.

15. The wellfield management system of claim 1, wherein the wellfield analysis system is configured to determine an optimal discharge rate based upon the difference between revenue from water pumped and cost of pumping.

16. The wellfield management system of claim 1, wherein the wellfield analysis system is configured to determine a period of time for a return on investment for performing well or pump rehabilitation or replacement.

17. The wellfield management system of claim 1, wherein the wellfield analysis system is configured to run scenarios for making decisions on where and when to perform well or pump rehabilitation or replacement based upon one or more of the following factors: well and wellfield information, pump curves, electrical power costs, replacement well costs, well rehabilitation costs, and imported water costs.

18. The wellfield management system of claim 1, wherein the pumping well and each of the one or more wells adjacent to the pumping well comprise a variable frequency pump configured to be started, stopped, and varied by one of the plurality of RTUs.

19. The wellfield management system of claim 1, wherein the SCADA system is configured to create a virtual model of the pumping well and the one or more wells adjacent to the pumping well.

20. The wellfield management system of claim 19, wherein the virtual model couples a head capacity curve of the pumping well with a head capacity curve of the SCADA communications system.

21. A computer-implemented method of automatic well-efficiency testing using a modulating valve or a variable frequency pump and a field instrument configured to measure water level in a pumping well and in one or more wells adjacent to the pumping well, the method comprising:
- receiving loop power data, wherein the loop power data is transmitted from a wellfield site transducer associated with a wellfield site to a wellfield analysis system via a Supervisory Control and Data Acquisition (SCADA) system, and wherein the loop power data comprises a discharge rate of the wellfield site;
- initiating a step drawdown test of well efficiency using the loop power data, the discharge rate of the wellfield site, and a water level of the wellfield site, wherein the step drawdown test comprises controlling or modulating water flow through the modulating valve or the variable frequency pump; and
- transmitting a command signal to alter pumping of the wellfield site based on the step drawdown test, wherein the command signal is transmitted via the SCADA system to the wellfield site.

22. The computer-implemented method of claim 21, wherein the loop power data is transmitted from the wellfield site transducer automatically when the wellfield site is powered on.

23. The computer-implemented method of claim 21, wherein the command signal alters pumping of the wellfield site using the modulating valve or the variable frequency pump configured to start, stop, or vary pumping at the wellfield site.

* * * * *